US 11,364,770 B2

(12) United States Patent
Schroeder et al.

(10) Patent No.: US 11,364,770 B2
(45) Date of Patent: Jun. 21, 2022

(54) REFRIGERATION SYSTEM FOR A VEHICLE, COMPRISING A REFRIGERANT CIRCUIT HAVING A HEAT EXCHANGER, AND HEAT EXCHANGER FOR SUCH A REFRIGERATION SYSTEM

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 99 days.

(21) Appl. No.: 16/628,172

(22) PCT Filed: Mar. 5, 2018

(86) PCT No.: PCT/EP2018/055260
§ 371 (c)(1),
(2) Date: Jan. 2, 2020

(87) PCT Pub. No.: WO2019/007558
PCT Pub. Date: Jan. 10, 2019

(65) Prior Publication Data
US 2021/0148616 A1    May 20, 2021

(30) Foreign Application Priority Data

Jul. 3, 2017  (DE) .................... 10 2017 211 256.5

(51) Int. Cl.
*B60H 1/00*  (2006.01)
*B60H 1/32*  (2006.01)
(Continued)

(52) U.S. Cl.
CPC ....... *B60H 1/00907* (2013.01); *B60H 1/3227* (2013.01); *F25B 40/00* (2013.01); *F25B 41/20* (2021.01); *B60H 2001/00928* (2013.01)

(58) Field of Classification Search
CPC .......... F25B 40/00; F25B 41/20; F25B 41/22; B60H 1/00907; B60H 1/3227; B60H 2001/00928
See application file for complete search history.

(56) References Cited

U.S. PATENT DOCUMENTS 9,908,383 B2 *   3/2018  Heyl ................. B60H 1/00899
10,989,479 B2 *  4/2021  Dziubinschi ........ F28D 1/05391
(Continued)

FOREIGN PATENT DOCUMENTS

DE    202012012516 U1   3/2013
DE    102011118162 A1   5/2013
(Continued)

OTHER PUBLICATIONS

European Examination Report dated Feb. 4, 2021, in connection with corresponding EP Application No. 18711496.2 (11 pp., including machine-generated English translation).
(Continued)

*Primary Examiner* — Miguel A Diaz
(74) *Attorney, Agent, or Firm* — Maier & Maier, PLLC

(57) ABSTRACT

A refrigeration system for a vehicle including a refrigerant circuit having a double-flow heat exchanger, it being possible to operate the heat exchanger as a refrigerant condenser/gas cooler for an AC mode or as an air heat pump evaporator for a heat pump mode. The first flow of the heat exchanger has a first refrigerant connection and the second flow of the heat exchanger has a second refrigerant connection. For double flow through the heat exchanger in AC mode the first refrigerant connection is a refrigerant inlet and
(Continued)

the second refrigerant connection is a refrigerant outlet. For single flow through the heat exchanger in heat pump mode the second refrigerant connection is a refrigerant inlet.

8 Claims, 2 Drawing Sheets

(51) Int. Cl.
*F25B 41/20* (2021.01)
*F25B 40/00* (2006.01)

(56) References Cited

U.S. PATENT DOCUMENTS

| | | | | |
|---|---|---|---|---|
| 2008/0023182 A1* | 1/2008 | Beamer | ............... | F28F 27/02 |
| | | | | 165/137 |
| 2008/0092573 A1* | 4/2008 | Vaisman | ............... | F25B 1/10 |
| | | | | 62/222 |
| 2008/0296005 A1* | 12/2008 | Taras | ............... | F25B 39/00 |
| | | | | 165/173 |
| 2011/0056668 A1* | 3/2011 | Taras | ............... | F28F 1/022 |
| | | | | 165/174 |
| 2012/0085114 A1* | 4/2012 | Graaf | ............... | B60H 1/143 |
| | | | | 62/238.7 |
| 2014/0075966 A1* | 3/2014 | Schmitz | ............ | B60H 1/00921 |
| | | | | 62/56 |
| 2014/0075972 A1* | 3/2014 | Heyl | ............... | B60H 1/00899 |
| | | | | 62/115 |
| 2015/0047384 A1* | 2/2015 | Matter, III | ............ | F25B 47/025 |
| | | | | 62/324.6 |
| 2020/0355412 A1* | 11/2020 | Wang | ............... | F28D 1/0443 |

FOREIGN PATENT DOCUMENTS

| | | |
|---|---|---|
| DE | 102012109038 A1 | 6/2013 |
| DE | 102012110702 A1 | 5/2014 |
| DE | 102013021360 A1 | 6/2015 |
| DE | 112015005449 T5 | 8/2017 |
| EP | 0855567 A2 | 7/1998 |
| EP | 1895255 A2 | 3/2008 |
| EP | 1895255 B1 | 11/2009 |
| JP | 2002-243296 A | 8/2002 |
| WO | 2012/112802 A2 | 8/2012 |
| WO | 2013/178667 A1 | 12/2013 |

OTHER PUBLICATIONS

German Examination Report dated Feb. 27, 2018 in corresponding German Application No. 10 2017 211 256.5; 24 pages; Machine translation attached.

International Search Report with English translation and Written Opinion with Machine translation dated Jun. 18, 2018 in corresponding International Application No. PCT/EP2018/055260; 22 pages.

Notification of Transmittal of Translation of the International Preliminary Report on Patentability dated Jan. 16, 2020, in connection with corresponding international Application No. PCT/EP2018/055260 (7 pgs.).

* cited by examiner

REFRIGERATION SYSTEM FOR A VEHICLE, COMPRISING A REFRIGERANT CIRCUIT HAVING A HEAT EXCHANGER, AND HEAT EXCHANGER FOR SUCH A REFRIGERATION SYSTEM

FIELD

The invention relates to a refrigeration system for a vehicle comprising a refrigerant circuit having a double-flow heat exchanger. Moreover, the invention relates to a heat exchanger for the refrigeration system according to the invention.

BACKGROUND

A double-flow heat exchanger with two manifolds arranged in parallel and spaced apart from each other, between which multiple heat exchanger (flat) tubes are placed and produce a fluidic connection with the manifolds, is known from EP 1 895 255 A2. In the first manifold there is arranged a separation element, which divides the cavity of the manifold into a first and a second chamber and thereby divides the heat exchanger tubes into a first and a second flow. At the first manifold there is provided a respective refrigerant connection for the first and second flow, and a further refrigerant connection is arranged at the second manifold. By means of a control device, the heat exchanger is switched between an evaporator mode for a heat pump mode and a condenser/gas cooler mode for a refrigeration system operation, by opening or closing the refrigerant connections in such a way that the refrigerant circulates as a single flow in the evaporator mode and as a double flow through all the heat exchanger tubes in the condenser/gas cooler mode.

By flow is meant the heat exchanger tubes through which the partial mass flows of refrigerant move parallel to each other and in the same direction, the number of which tubes is determined by the position of one or more separation element situated in a manifold.

A refrigeration system of this kind with a multiple-flow heat exchanger for a combined operation in AC mode or heat pump mode is known from DE 10 2012 110 702 A1. In this multiple-flow heat exchanger, the separating means in the manifolds can be switched, so that the refrigerant can be led through a different number of flows depending on the flow direction and the operating mode. In the AC mode, the flow direction of the refrigerant is opposite to the flow direction of the refrigerant in heat pump mode.

Moreover, there is known from DE 20 2012 012 516 U1 a heating/cooling module comprising a refrigerant circuit having a compressor, a gas cooler, an expansion element and an evaporator, in which the gas cooler is formed as a first liquid heat exchanger, through which a coolant flows, and the evaporator is formed as a second liquid heat exchanger, through which a coolant flows. The compressor, the gas cooler and thus the first liquid heat exchanger are arranged in thermal contact with each other; furthermore, the expansion element, the evaporator and hence the second liquid heat exchanger are arranged in thermal contact with each other; and finally, the compressor, the gas cooler and hence the first liquid heat exchanger on the one hand and the expansion element, the evaporator and hence the second liquid heat exchanger on the other hand are arranged separated from each other by a thermal insulation region. In this known heating/cooling module, the warm components are structurally brought together, as are the cold component, which is meant to achieve a thermal partitioning that avoids heat losses and increases the efficiency. This heating/cooling module can also be used as a heat pump.

The first liquid heat exchanger of this heating/cooling module known from DE 20 2012 012 516 U1 is insensitive to pressure losses in the evaporator, since no frosting and thus blocking of surfaces of the heat exchanger can occur on the coolant side. Thanks to the indirect process management in this heating/cooling module, no contact exists between the refrigeration circuit and the surroundings, such contact being produced only through the liquid as heat transfer agent.

Furthermore, DE 10 2012 109 038 A1 describes a device for a refrigerant circuit having a heat exchanger for heat transfer between the refrigerant and the air. The heat exchanger is designed with a valve and a collector as a compact, cohesive module with integrated refrigerant connections. The valve is arranged integrated inside the collector or inside the heat exchanger and designed as a connection element between the collector and the heat exchanger. Such a device is intended for use in a refrigerant circuit of an air conditioner for conditioning the air of a motor vehicle passenger compartment.

Finally, a vehicle air conditioning device is described in DE 11 2015 005 449 T5, being capable of continuing the air conditioning the passenger compartment of a vehicle even in the event that a fault occurs in a magnetic valve, so as to change the flow of a refrigerant in every operating mode. This vehicle air conditioning device comprises a magnetic valve for the cooling, a magnetic valve for the heating, and a magnetic valve for the dehumidification, in order to switch between any given operating modes of the vehicle air conditioning device. A control device switches and manages the respective operating modes of a heating operation, a dehumidification operation, and a cooling operation. The control device has a predetermined fault air conditioning mode and a fault detection means for detecting a fault in the magnetic valve. In the event that the fault detection means detects that the magnetic valves are not working in the respective operating modes, the control device selects the fault air conditioning mode, in which an air conditioning of the vehicle interior can be achieved by the operating mode in order to continue the air conditioning of the vehicle. In this known vehicle climate control device, a condenser with integrated modulator/high-pressure collector as well as a subcooling section are used, which are respectively switched to be active for the AC mode and inactive for the heat pump mode. Hence, the use of the condenser grid for the refrigerant evaporation is reduced solely to the condensation section. Consequently, the entire useful surface of the condenser is not used for the air heat pump process. Check valves and shut-off valves are used to implement the sectioning.

The problem which the invention proposes to solve is to indicate a refrigeration system for a vehicle with a refrigerant circuit comprising a heat exchanger, by which an optimal flow is made possible both in an AC mode and in a heat pump mode in order to ensure the best performance. Moreover, it should be possible to carry out the heat pump mode optimized for pressure losses.

Another problem of the invention is to indicate a heat exchanger for the refrigeration system.

SUMMARY

Such a refrigeration system for a vehicle comprising a refrigerant circuit having a double-flow heat exchanger, it being possible to operate the double-flow heat exchanger as a refrigerant condenser or gas cooler for an AC mode or as an air heat pump evaporator for a heat pump mode, is characterized according to the invention in that the first flow of the heat exchanger has a first refrigerant connection and the second flow of the heat exchanger has a second refrigerant connection, wherein for double flow through the heat exchanger in AC mode the first refrigerant connection is a refrigerant inlet and the second refrigerant connection is a refrigerant outlet, and for single flow through the heat exchanger in heat pump mode the second refrigerant connection is a refrigerant inlet, wherein to control the flow of the refrigerant from the second refrigerant connection to the first refrigerant connection a unidirectional valve member fluidically connects the second refrigerant connection to the first refrigerant connection, the heat exchanger has at least one third refrigerant connection, which is fluidically connected as a refrigerant outlet to the first flow and the second flow on the refrigerant output side, and the third refrigerant connection is fluidically connected to a valve member to control the refrigerant exiting the heat exchanger.

Such a refrigeration system according to the invention can be operated with the slightest pressure loss in the heat pump mode, so that the risk of frosting is minimized. Moreover, a homogeneous temperature distribution is achieved over the entire surface of the heat exchanger in the heat pump mode. Hence, on the one hand, it is possible to raise the low-pressure level and thereby boost the system efficiency, and on the other hand the refrigerant mass flow can be increased, since the system, and especially the refrigerant compressor, only needs to be energized at a later time.

According to one advantageous modification of the invention, it is provided that the heat exchanger has a fourth refrigerant connection, which is fluidically connected as a second refrigerant outlet beside the third refrigerant connection as the first refrigerant outlet to the first flow on the refrigerant outlet side and to the second flow on the refrigerant outlet side, and the third and fourth refrigerant connection is fluidically connected to the valve member in order to control the refrigerant exiting the heat exchanger.

In this embodiment of the invention with at least two refrigerant outlets, a further optimization of the flow through the heat exchanger is achieved for the heat pump mode of the heat exchanger, especially for the air heat pump mode, since the refrigerant in the air heat pump mode can flow more uniformly over the two refrigerant outlets. This effect can be further intensified by the realization of further refrigerant outlets, so that the heat exchanger would have more than two, e.g., three or four such refrigerant outlets.

The refrigeration system can be operated with high performance in the AC mode if, according to one modification, the heat exchanger is divided asymmetrically in order to form the first and second flow. A symmetrical division can also be realized.

In advantageous manner according to one modification of the invention, the unidirectional valve member is designed as a check valve. Preferably, according to one modification, the valve member connected to the third refrigerant connection is designed as a shut-off valve.

The second mentioned aspect is solved by a heat exchanger having the features of patent claim 6.

Such a heat exchanger for a refrigeration system according to the invention comprises:

a first manifold and a second manifold, which are oriented at a spacing from each other, heat exchanger tubes for producing a fluidic connection between the manifolds, a separation element arranged in the first manifold to subdivide the heat exchanger tubes into a first and a second flow, wherein the first manifold comprises a first refrigerant connection for the first flow and a second refrigerant connection for the second flow, and at least one third refrigerant connection connected to the second manifold.

Generally in the AC mode there is an inflow of the refrigerant into the upper flow and then a diversion of the refrigerant via the second manifold into the lower second flow. With an asymmetrical flat tube subdivision, the larger number of flat tubes is assigned to the entry section, being less than the exit section.

For the heat pump mode, this would mean an inflow in the lower flow and a diversion as well as an outflow from the upper flow.

An especially advantageous embodiment of the heat exchanger according to the invention provides a fourth refrigerant connection connected to the second manifold. Preferably, this collector block is situated in the region of the second manifold, i.e., it is integrated as components of the heat exchanger. The collector block serves to bring together the third and fourth refrigerant connections. If more than two such refrigerant connections are provided, these are likewise brought together by such a collector block.

Usually the collector block can be realized as a separate component from the heat exchanger.

According to a last preferred modification of the invention, the heat exchanger is designed with a unidirectional valve member in the region of the first manifold, by which the first refrigerant connection is connected to the second refrigerant connection in such a way that a refrigerant flow in the direction of the second refrigerant connection is prevented. This valve member can be integrated in the heat exchanger in the region of the first manifold. Here as well, the unidirectional valve member can also be realized as a component separate from the heat exchanger.

BRIEF DESCRIPTION OF THE DRAWINGS

The invention shall be described more fully below with the aid of exemplary embodiments, making reference to the enclosed figures. There are shown.

DETAILED DESCRIPTION

Figure 1:
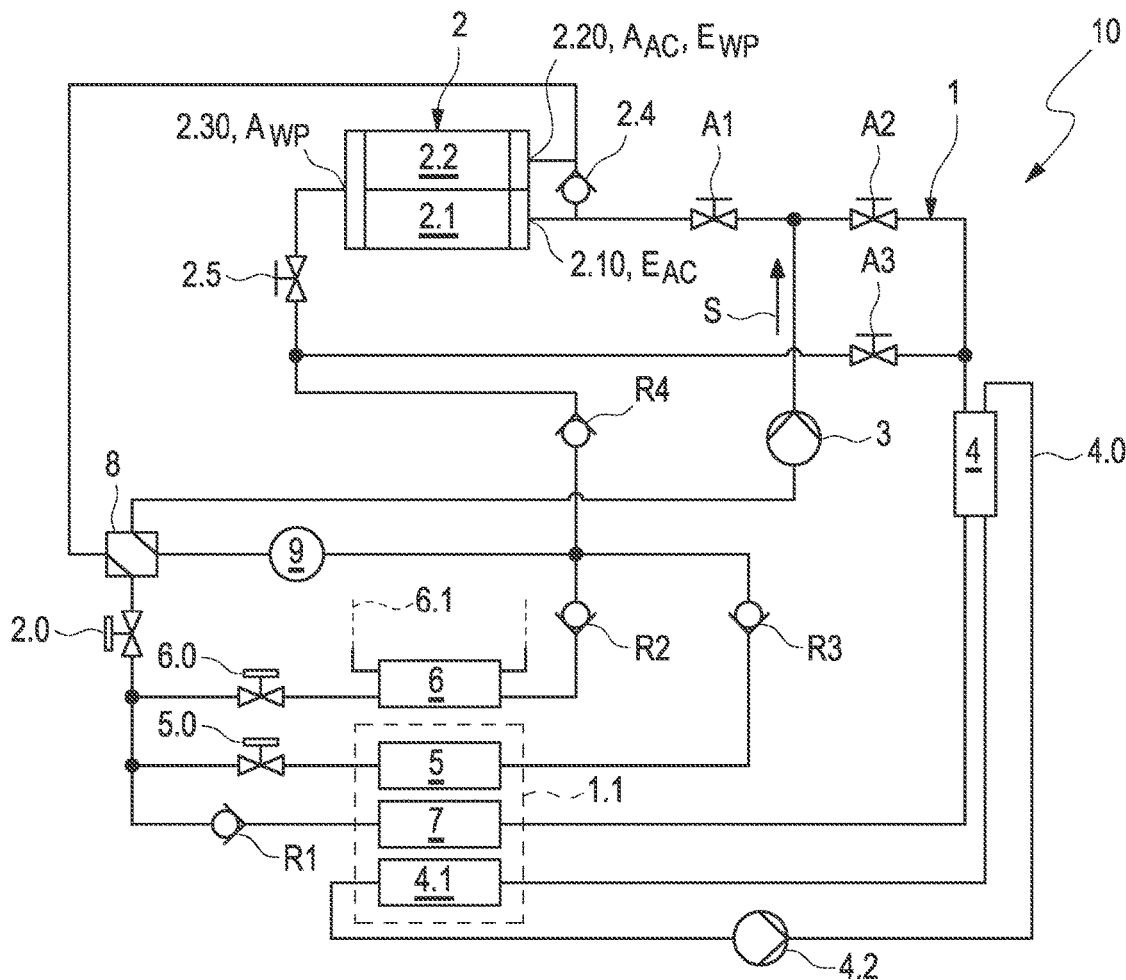
FIG. 1, a diagram of an exemplary embodiment of a refrigeration system according to the invention having a heat exchanger, FIG. 2, a schematic representation of an exemplary embodiment of a heat exchanger according to the invention of the refrigeration system of FIG. 1, FIG. 3, a diagram of another exemplary embodiment of a refrigeration system according to the invention having a heat exchanger, and FIG. 4, a schematic representation of an exemplary embodiment of a heat exchanger according to the invention of the refrigeration system of FIG. 3.
Figure 3:
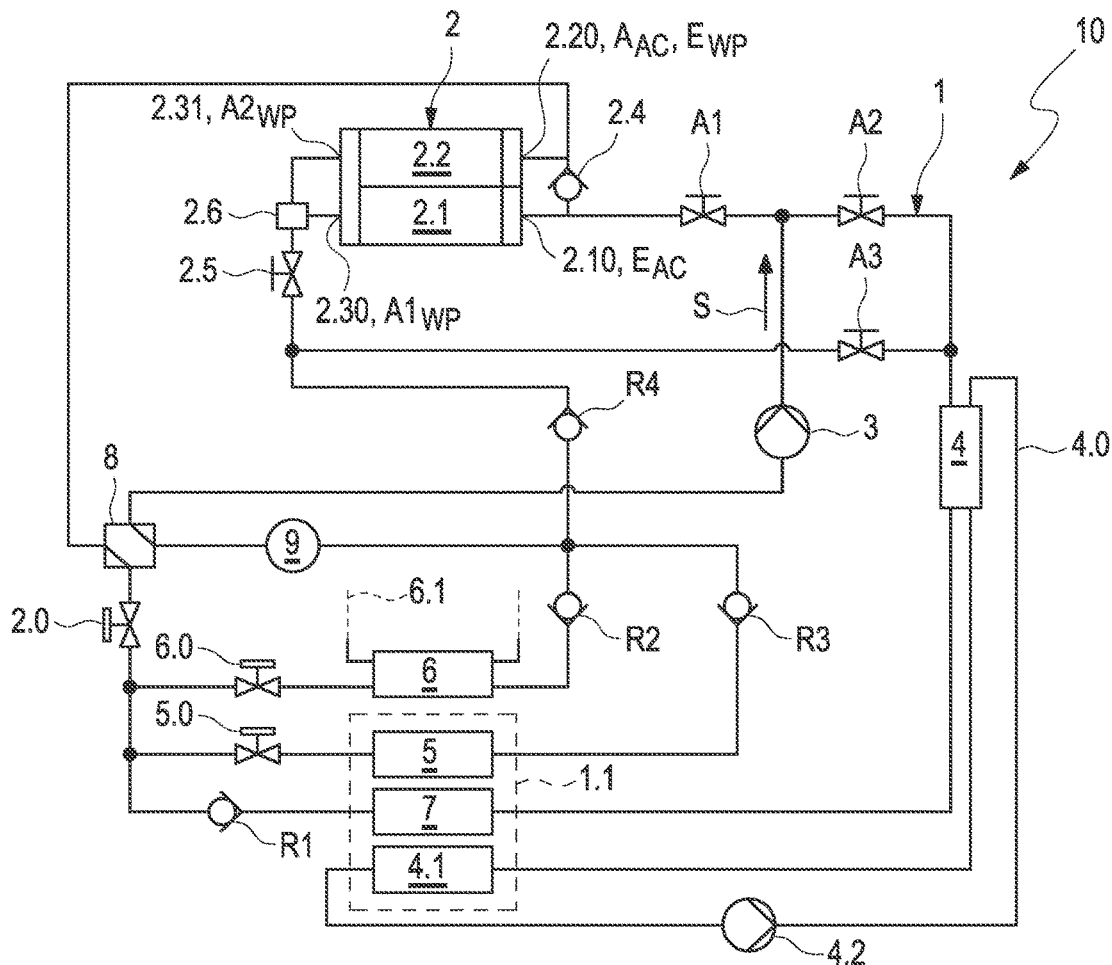

The refrigeration system 10 for a vehicle as represented in FIGS. 1 and 3 consists of a refrigerant circuit 1 with carbon dioxide (R744) as the refrigerant or with some other suitable refrigerant. This refrigerant circuit 1 can be operated both in an AC mode and in a heat pump mode for the conditioning of an intake air stream which is led into the interior of the vehicle.

This refrigerant circuit 1 comprises a double-flow heat exchanger 2, which is used both as a gas cooler or condenser for the AC mode and also takes on the function of a heat pump evaporator in the heat pump mode. The heat exchanger 2 of FIG. 1 is designed with a first flow 2.1 and a second flow 2.2 having three refrigerant connections, namely, a first refrigerant connection 2.10, a second refrigerant connection 2.20 and a third refrigerant connection 2.30. The heat exchanger 2 of FIG. 3 additionally has a fourth refrigerant connection 2.31.

The first and second refrigerant connection 2.10 and 2.20 according to FIGS. 1 and 3 are joined by means of a unidirectional valve member 2.4, which is designed in the most simple form as a check valve, so that refrigerant can only flow from the first refrigerant connection 2.10 to the second refrigerant connection 2.20.

According to FIG. 1, the third refrigerant connection 2.30 is connected to a valve member 2.5 designed as a shut-off valve. The design of this double-flow heat exchanger 2 is explained in detail with the aid of FIG. 2.

The two refrigerant connections 2.30 and 2.31 of the heat exchanger 2 of FIG. 3 are at first brought together with a collector block 2.6, which is connected to the valve member 2.5 designed as a shut-off valve.

The refrigerant circuit 1 of FIGS. 1 and 3, besides the heat exchanger 2, consists of a refrigerant compressor 3, a refrigerant/coolant heat exchanger 4 having a heating heat exchanger 4.1 on the coolant side, an evaporator 5, a chiller 6, which is thermally coupled on the coolant side to heat-generating electrical or electronic components arranged in a cooling circuit 6.1, such as an electrical energy accumulator, an internal heat exchanger 8 and a refrigerant collector 9. These components are connected to shut-off valves A1 to A3 as well as check valves R1 to R4 in order to realize the different operating modes of the refrigerant circuit 1.

Furthermore, a respective expansion element 2.0, 5.0 and 6.0 is connected upstream from each heat exchanger 2, 5 and 6 working as an evaporator.

In the AC mode of the refrigerant circuit 1, the refrigerant compressed by means of the refrigerant compressor 3 is taken in the flow direction S, the shut-off valve A2 being closed, across the open shut-off valve A1 into the heat exchanger 2, namely, via its first refrigerant connection 2.10. It flows through the heat exchanger 2 in a double flow and leaves the heat exchanger 2 via its second refrigerant connection 2.20, by which the refrigerant is cooled down or cooled down and condensed, giving off the heat of condensation to the surroundings of the vehicle. The valve member 2.5 designed as a shut-off valve is closed in this AC operating mode. The valve member 2.4 is oriented, as a check valve, so that no refrigerant can flow directly from the first refrigerant connection 2.10 to the second refrigerant connection 2.20.

Thus, in the AC mode, the first refrigerant connection 2.10 is used as a refrigerant inlet $E_{AC}$ and the second refrigerant connection 2.20 is used as a refrigerant outlet $A_{AC}$, so that the refrigerant flows at first through the refrigerant inlet $E_{AC}$ into the first flow 2.1 and then through the second flow 2.2, before it leaves the heat exchanger 2 once again by the refrigerant outlet $A_{AC}$.

Figure 2:
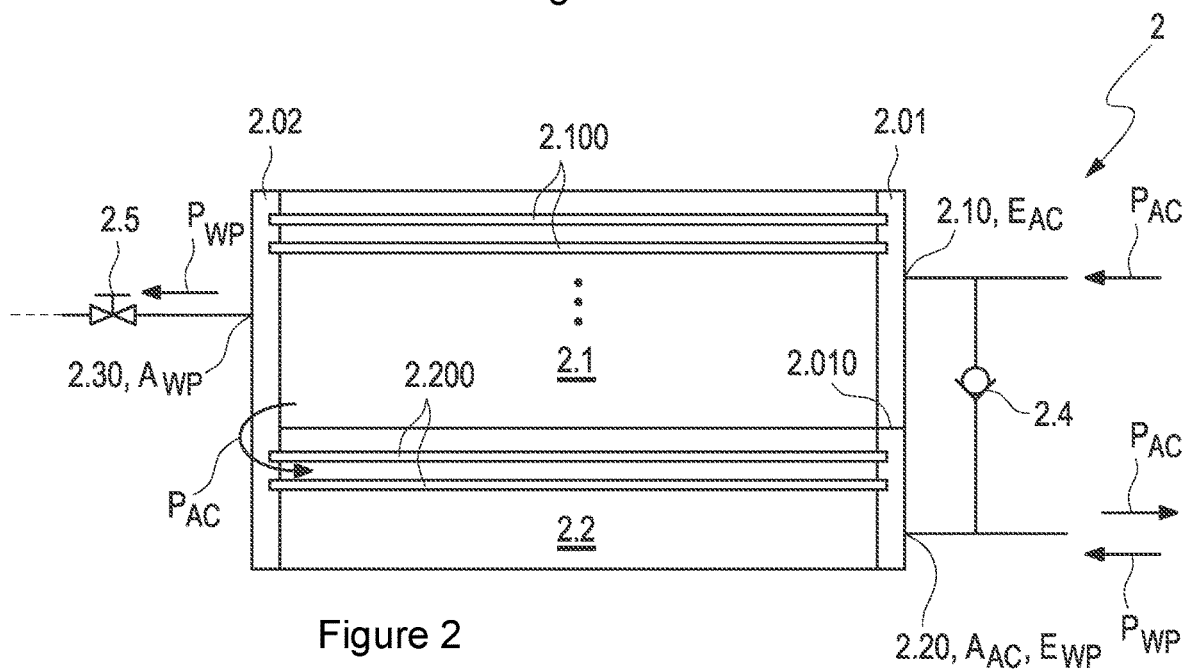
Figure 4:
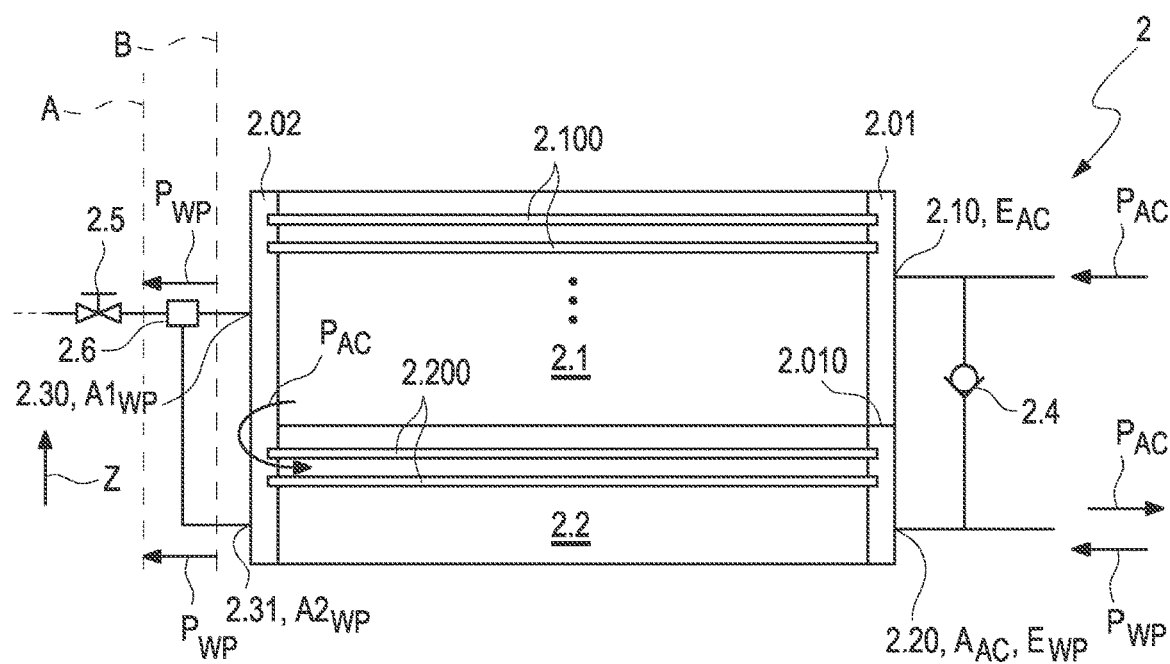

According to FIGS. 2 and 4, this double-flow heat exchanger 2 is composed of two manifolds arranged in parallel and at a spacing from each other, namely, a first manifold 2.01 and a second manifold 2.02. Between the two manifolds 2.01 and 2.02, heat exchanger tubes 2.100 and 2.200 produce a fluidic connection. The dividing of the heat exchanger tubes into a first flow 2.1 and a second flow 2.2 is done by means of a separation element 2.010 arranged in the first manifold 2.01. In this way, the heat exchanger tubes 2.100 form the first flow 2.1, which is connected to the first refrigerant connection 2.10, while the heat exchanger tubes 2.200 for the second flow 2.2, which is connected to the second refrigerant connection 2.20.

Hence, in the AC mode, the refrigerant flows according to the arrows $P_{AC}$ by the first refrigerant connection 2.10 as the refrigerant inlet $E_{AC}$ at first into the heat exchanger tubes 2.100 of the first flow 2.1 and then by the second manifold 2.02 in the opposite direction through the heat exchanger tubes 2.200 of the second flow 2.2 back into the first manifold 2.01 and leaves the heat exchanger 2 by the second refrigerant connection 2.20 as the refrigerant outlet $A_{AC}$. FIG. 2 shows the heat exchanger 2 schematically with an asymmetrical tube distribution. For example, the division of the first flow 2.1 and the second flow 2.2 is ⅔ to ⅓ (or 60% to 40%) in the apportionment of the area ratios. With such an asymmetrical tube distribution, the best performance in AC mode is achieved; in particular, in the heat pump mode, a homogeneous refrigerant distribution in all flat tubes of the two flows 2.1 and 2.2 with minimal component pressure loss is accomplished over the entire component height in the vertical vehicle direction (the z-direction).

After the refrigerant has left the refrigerant outlet $A_{AC}$ of the heat exchanger 2, according to FIGS. 1 and 3, it is taken through the high-pressure section of the internal heat exchanger 8 and expanded through the opened expansion element 2.0 by means of the expansion elements 5.0 and 6.0 into the evaporator and the chiller 6, in order to take up heat from the vehicle interior and waste heat of the high-voltage accumulator, for example. The check valve R1 in this case is switched so that a back flow into the heat register 7 and the refrigerant/coolant heat exchanger 4 is prevented. The expansion element 6.0 may possibly also be blocked. The refrigerant is then taken across the check valves R2 and R3, the refrigerant collector 9, and the low-pressure section of the internal heat exchanger 8 back to the refrigerant compressor 3, no refrigerant being able to flow across the check valve R4.

The two cross sections of the two connections $E_{AC}$ and $A_{AC}$ may be designed on account of sealing conditions in the refrigerant such that the cross section of the refrigerant inlet $E_{AC}$ is >the cross section of the refrigerant outlet $A_{AC}$. Of course, the same cross section areas can also be used for the two connections $E_{AC}$ and $A_{AC}$.

In the case of the heat exchanger 2 according to FIGS. 2 and 4, the refrigerant inlet $E_{AC}$ looking in the vehicle height direction (z-direction) is situated above the refrigerant outlet $A_{AC}$. These two connections $E_{AC}$ and $A_{AC}$ may be interchanged, so that the refrigerant inlet $E_{AC}$ lies beneath the refrigerant outlet $A_{AC}$. The orientation of the unidirectional valve member 2.4 should be adapted accordingly.

In the heat pump mode, the refrigerant compressed by the refrigerant compressor 3 according to FIGS. 1 and 3 flows in the flow direction S with shut-off valve A1 closed and shut-off valve A2 open across the refrigerant heat exchanger 4 and the heat register 7 and is expanded by means of the expansion element 2.0 into both the downstream internal heat exchanger 8 and into the heat exchanger 2, which is now working as a heat pump evaporator, with the refrigerant flowing as a single flow through the heat exchanger 2. For this, both the first and the second refrigerant connection 2.10 and 2.20 serve as a refrigerant inlet for the refrigerant, while according to FIG. 1 a third refrigerant connection 2.30 serves as the refrigerant outlet AWP by which the refrigerant is then taken back across the open shut-off valve/valve member 2.5, the check valve R4, the refrigerant collector 9 and the low-pressure section of the internal heat exchanger 8 to the refrigerant compressor 3. The two check valves R2 and R3 in this case prevent a flowing of refrigerant through the evaporator 5 and the chiller 6. The refrigerant line to be attached to the third refrigerant connection 2.30 of the heat exchanger 2 should have a few pressure losses as possible and should be connected to the second manifold 2.02, for example by soldering.

In the refrigerant circuit 1 of FIG. 3, besides the third refrigerant connection 2.30 as the first refrigerant outlet $A1_{WP}$ in the heat exchanger 2 there is provided the fourth refrigerant connection 2.31 as a second refrigerant outlet $A2_{WP}$ for the heat pump mode, the first and second refrigerant outlet $A1_{WP}$ and $A2_{WP}$ being brought together in a collector block 2.6, which in turn is fluidically connected to the valve member 2.5 designed as a shut-off valve. In this heat exchanger 2 of FIG. 4, the two refrigerant connections 2.30 and 2.31 are arranged one above the other in the vehicle height direction (z-direction), so that the third refrigerant connection 2.30 lies at the height of the second flow 2.2 and the fourth refrigerant connection 2.31 lies at the height of the first flow 2.1. The refrigerant flowing from the first and second refrigerant outlet $A1_{WP}$ and $A2_{WP}$ is collected in the collector block 2.6 and then taken back across the open shut-off valve/valve member 2.5, the check valve R4, the refrigerant collector 9 and the low-pressure section of the internal heat exchanger 8 to the refrigerant compressor 3. In this process, the two check valves R2 and R3 prevent a flow of refrigerant through the evaporator 5 and the chiller 6. The third refrigerant connection 2.30 situated on top in the vehicle height direction and the fourth refrigerant connection 2.31 of the heat exchanger 2 of FIG. 4 situated underneath in the vehicle direction are used only for evaporated refrigerant emerging in the heat pump process.

Thus, according to FIG. 2 and FIG. 4, the second refrigerant connection 2.20 in heat pump mode serves as the refrigerant inlet $E_{WP}$, which is fluidically connected across the unidirectional valve member 2.4, designed as a check valve, to the first refrigerant connection 2.10, so that refrigerant can flow only from the second refrigerant connection 2.20 into the first refrigerant connection 2.10 and not the reverse. After the refrigerant has flowed through both the first flow 2.1 and the second flow 2.2 in the same direction, it is brought together in the second manifold 2.02 and returned per FIG. 2 across the third refrigerant connection 2.30 as the refrigerant outlet $A_{WP}$ and the opened valve member 2.5 to the refrigerant circuit 1, or per FIG. 4 it is returned both by the third refrigerant connection 2.30 as the first refrigerant outlet $A1_{WP}$ and by the fourth refrigerant connection 2.31 as the second refrigerant outlet $A2_{WP}$ across the collector block 2.6 and then across the opened valve member 2.5 to the refrigerant circuit 1. The refrigerant flow in the heat pump mode is indicated schematically in FIGS. 2 and 4 with the arrows $P_{WP}$.

The heat exchanger 2 of FIGS. 2 and 4 receives a single flow in the heat pump mode and is optimized for pressure losses. For a further optimization of the heat pump mode, it is only necessary to adapt the low-pressure branch of the refrigerant circuit 1, i.e., the line sections upstream from the expansion element 2.0 and up to the low-pressure inlet of the refrigerant compressor 3, to the low-pressure dimension for the AC mode in regard to the line and the flow cross sections. The same holds for an optimization of the air heat pump mode for the line dimensions downstream from the third refrigerant connection 2.30 and from the fourth refrigerant connection 2.31 up to and including the line section downstream from the check valve R4. The refrigerant connections 2.10 and 2.20 of the heat exchanger 2 can be designed with an optimal dimension for the AC operation.

This ensures a uniform refrigerant distribution across the heat exchanger 2 within the refrigerant-carrying heat exchanger tubes 2.100 and 2.200.

In the heat exchanger 2 of FIG. 4, the two refrigerant outlets $A1_{WP}$ and $A2_{WP}$ are at first brought together at the collector block 2.6, before the refrigerant flows across the valve member 2.5 into the refrigerant circuit 1. The collector block 2.6 in this case may be integrated in the heat exchanger 2 by being situated therein in the region of the second manifold 2.02. This state is represented in FIG. 4 as line A, which then represents the interface with the refrigerant line as part of the heat exchanger 2.

On the other hand, it is also possible to realize the collector block 2.6 as a separate component from the heat exchanger 2. This state is represented in FIG. 4 by a line B, whereby two interfaces are provided between the heat exchanger 2 and the refrigerant circuit.

The unidirectional valve member 2.4 designed as a check valve can also be integrated in the heat exchanger 2 per FIGS. 2 and 4 or be realized as a separate component from the heat exchanger 2.

The unidirectional valve member 2.4 for its part may also be designed as an electrical shut-off valve actuated from the outside.

The following steps are taken in order to reduce the pressure and flow losses in the refrigerant circuits per FIGS. 1 and 3:

The refrigerant lines are designed as straight as possible and with no angles.
  The cross section of the refrigerant outlet $A_{WP}$ of the heat exchanger 2 per FIG. 2 is increased to the dimension of the low-pressure line between the evaporator 5 and the refrigerant compressor 3.
  In the design of the heat exchanger 2 per FIG. 4, the cross sections of the two refrigerant outlets $A1_{WP}$ and $A2_{WP}$ are the same and ideally amount in total to the cross section area of the low-pressure line running between the evaporator 5 and the refrigerant compressor 3. With such a dimensioning, a symmetrical dividing of the first flow 2.1 and the second flow 2.2 should be chosen advantageously, i.e., an identical flat tube distribution for the two flows 2.1 and 2.2.

For an asymmetrical dividing of the first (larger) flow 2.1 and the second (smaller) flow 2.2, it is also advantageous to design the connection lines of the two refrigerant outlets $A1_{WP}$ and $A2_{WP}$ as far as the collector block 2.6 with a cross section area in total which corresponds at least to the value of the following connection line. However, in this case the line cross section of the tube connected to the larger flow 2.1 should be larger in area than the value of the tube connected to the smaller flow 2.2.

The heat taken up by means of the heat exchanger 2, together with the energy put into the system by the refrigerant compressor 3, is transferred on the one hand indirectly across the refrigerant/coolant heat exchanger 4, which is thermally coupled across a heating circuit 4.0 comprising a coolant pump 4.2 to the heating heat exchanger 4.1, and directly by means of the heat register 7 to the intake air conducted into the vehicle interior. The evaporator 5, the heat register 7 and the heating heat exchanger 4.1 are arranged in an air conditioner 1.1 of the refrigeration system 10.

The line section with the shut-off valve A3 of the refrigerant circuit 1 is a suction line section, which connects the line section between the shut-off valve A2 and the refrigerant/coolant heat exchanger 4 to the line section between the valve member 2.5 and the check valve R4.

It should be noted that the number of connections to the heat exchanger (gas cooler/condenser), which has two connections (inlet/outlet) for the refrigeration system mode and an air heat pump mode, can be adapted and increased to any given number as needed. Thus, besides the design with three connections and the described variant with four connections, connections in a number larger than four are also possible.

It is also possible to increase not only the number of connections at the second manifold 2.02 of the heat exchanger 2, but also those at its first manifold 2.01. Thus, besides the first refrigerant connection 2.10, at least one further refrigerant connection may be realized for the first flow 2.1, and besides the second refrigerant connection 2.20 there may likewise be realized at least one further refrigerant connection for the second flow. The refrigerant connections for the first flow and the second flow may respectively be brought together in a single collector block.

LIST OF REFERENCE NUMBERS

1 Refrigerant circuit of the refrigeration system 10
1.1 Air conditioner
2 Heat exchanger of the refrigerant circuit 1
2.0 Expansion element of the refrigerant circuit 1
2.01 First manifold of the heat exchanger 2
2.010 Separation element of the first manifold 2.01
2.02 Second manifold of the heat exchanger 2
2.1 First flow of the heat exchanger 2
2.10 First refrigerant connection of the first flow 2.1
2.100 Heat exchanger tubes of the first flow 2.1
2.2 Second flow of the heat exchanger 2
2.20 Second refrigerant connection of the second flow 2.2
2.200 Heat exchanger tubes of the second flow 2.2
2.30 Third refrigerant connection
2.31 Fourth refrigerant connection
2.4 Unidirectional valve member
2.5 Valve member
2.6 Collector block
3 Refrigerant compressor of the refrigerant circuit 1
4 Refrigerant/coolant heat exchanger of the refrigerant circuit 1
4.0 Heating circuit
4.1 Heating heat exchanger of the refrigerant circuit 1
4.2 Coolant pump
5 Evaporator of the refrigerant circuit 1
5.0 Expansion element of the refrigerant circuit 1
6 Chiller of the refrigerant circuit 1
6.0 Expansion element of the refrigerant circuit 1
7 Heat register of the refrigerant circuit 1
8 Internal heat exchanger
9 Refrigerant collector
10 Refrigeration system of a vehicle
$A_{AC}$ Refrigerant outlet in AC mode
$A1_{WP}$ Refrigerant outlet in heat pump mode
$A2_{WP}$ Refrigerant outlet in heat pump mode
$E_{AC}$ Refrigerant inlet in AC mode
$E_{WP}$ Refrigerant inlet heat pump mode
A1 to
A3 Shut-off valves
R1
to R4 Check valves
$P_{AC}$ Arrow for refrigerant flow in AC mode
$P_{WP}$ Arrow for refrigerant flow heat pump mode
S Flow direction of refrigerant circuit 1

The invention claimed is:

1. A refrigeration system for a vehicle, comprising:
a refrigerant circuit having a double-flow heat exchanger, the refrigerant circuit being configured to operate the double-flow heat exchanger as a refrigerant condenser or gas cooler for an AC mode or as an air heat pump evaporator for a heat pump mode, wherein
the first flow of the double-flow heat exchanger has a first refrigerant connection and the second flow of the double-flow heat exchanger has a second refrigerant connection, wherein for double flow through the double-flow heat exchanger in the AC mode the first refrigerant connection is a refrigerant inlet and the second refrigerant connection is a refrigerant outlet, and
for single flow through the double-flow heat exchanger in the heat pump mode the second refrigerant connection is a refrigerant inlet, wherein
to control the flow of the refrigerant from the second refrigerant connection to the first refrigerant connection a unidirectional valve member fluidically connects the second refrigerant connection to the first refrigerant connection,
the double-flow heat exchanger has at least one third refrigerant connection, which is fluidically connected as a refrigerant outlet to the first flow and the second flow on a side of the double-flow heat exchanger opposite the first refrigerant connection and the second refrigerant connection,
the third refrigerant connection is fluidically connected to a valve member to control the refrigerant exiting the double-flow heat exchanger;
wherein the first refrigerant connection, the second refrigerant connection, and the third refrigerant connection are positioned vertically, with respect to a vehicle height direction, such that the second refrigerant connection is at a lowest point and the first refrigerant connection and the third refrigerant connection are each at a higher vertical position than the second refrigerant connection; and
wherein the double-flow heat exchanger is divided asymmetrically and has an area ratio configured to form the first and second flow with a homogeneous refrigerant distribution, wherein said area ratio of the first flow to the second flow is at least 60% to 40%.

2. The refrigeration system according to claim 1, wherein the double-flow heat exchanger has a fourth refrigerant connection, which is fluidically connected as a second refrigerant outlet beside the third refrigerant connection as a first refrigerant outlet to the first flow and to the second flow, on the side of the double-flow heat exchanger opposite the first refrigerant connection and the second refrigerant connection, and
the third and fourth refrigerant connections are fluidically connected to the valve member in order to control the refrigerant exiting the double-flow heat exchanger.

3. The refrigeration system according to claim 1, wherein the unidirectional valve member is designed as a check valve.

4. The refrigeration system according to claim 1, wherein the valve member connected to the third refrigerant connection is designed as a shut-off valve.

5. The refrigeration system according to claim 1, wherein the double-flow heat exchanger comprises:
- a first manifold and a second manifold, which are oriented at a spacing from each other,
- heat exchanger tubes for producing a fluidic connection between the manifolds,
- a separation element arranged in the first manifold to subdivide the heat exchanger tubes into the first flow and the second flow, wherein the first manifold has the first refrigerant connection for the first flow and the second refrigerant connection for the second flow, and
- the at least one third refrigerant connection connected to the second manifold.

6. The refrigeration system according to claim 5, wherein the unidirectional valve member is disposed adjacent the first manifold, by which the first refrigerant connection is connected to the second refrigerant connection in such a way that a refrigerant flow in the direction of the second refrigerant connection is prevented.

7. The refrigeration system according to claim 5, wherein a fourth refrigerant connection is connected to the second manifold.

8. The refrigeration system according to claim 7, wherein the double-flow heat exchanger includes a collector block adjacent the second manifold.

* * * * *